July 21, 1936.  G. WALTHER  2,048,150
METAL WHEEL
Filed March 23, 1932  2 Sheets-Sheet 1

INVENTOR,
George Walther,
BY
Howard S. Smith,
ATTORNEY

July 21, 1936.   G. WALTHER   2,048,150
METAL WHEEL
Filed March 23, 1932   2 Sheets-Sheet 2

INVENTOR,
George Walther,
BY Howard S. Smith.
His ATTORNEY

Patented July 21, 1936

2,048,150

UNITED STATES PATENT OFFICE 2,048,150

METAL WHEEL

George Walther, near Dayton, Ohio, assignor to The Dayton Steel Foundry Company, Dayton, Ohio, a corporation of Ohio Application March 23, 1932, Serial No. 600,802

2 Claims. (Cl. 301—12)

This invention relates to new and useful improvements in metal wheels.

It is one of the principal objects of my invention to provide for a metal wheel, an edge-supported rim mounting wherein the rim is positively aligned against a fixed stop on the felloe by an outboard wedge clamp which engages the knuckle part of the rim gutter. This form of mounting promotes economy of production by reducing the number of parts to the minimum and permits the rim to be easily mounted from the outboard side of the wheel with a minimum of effort. For example, it dispenses with means such as a separate alining ring that would have to be provided if the wedge clamp bore directly against the beveled part of the rim.

By bringing the support for the rim axially outward of the beveled part of the rim, the fulcrum of the latter is merged in the supporting clamp which is given the necessary tension engagement with the knuckle part of the rim gutter to insure a firm mounting for it in alinement with a plane at right angles to the axis of the wheel.

It is another object of my invention to provide a substantially similar mounting for the edge-supported rims of a dual wheel, save that the inboard side of the spacer band is formed to engage the knuckle part of the gutter of the inboard rim, which is formed with a shoulder that engages a fixed alining stop on the inboard side of the felloe.

Another object of my invention is to provide a metal wheel body formed with grooved spoke ends to receive the apron portions of a spacer band inserted between two overhanging rims to positively align them on the spoke ends.

Still another object of my invention is to provide for a dual wheel, a hub to which an extended hub portion is secured, with a gasket placed between the extended hub portion and the hub to prevent the nuts on the securing bolts from loosening up in service.

Other important and incidental objects will be brought out in the following specification and particularly set forth in the subjoined claims.

Figure 1:
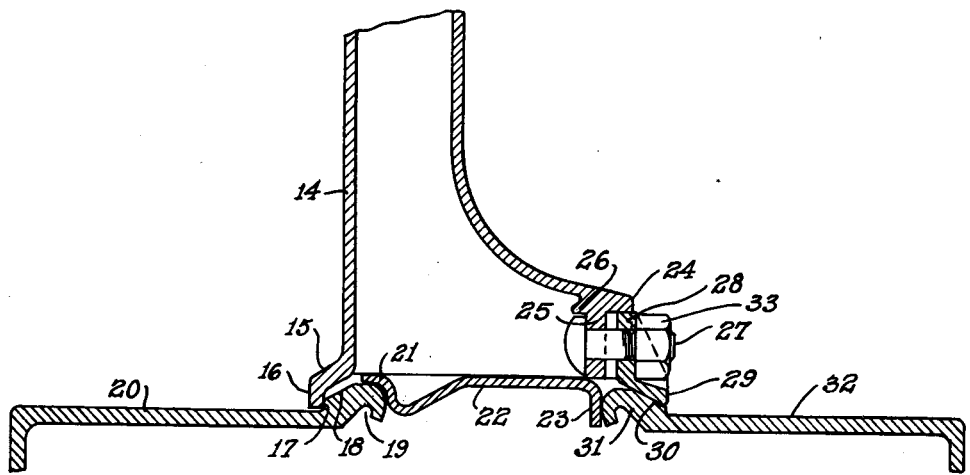
Figure 3:
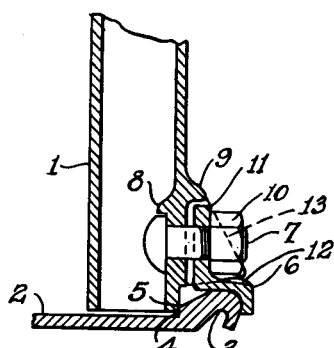
Figure 2:
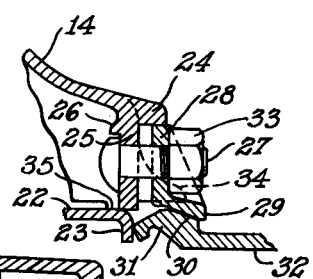
Figure 4:
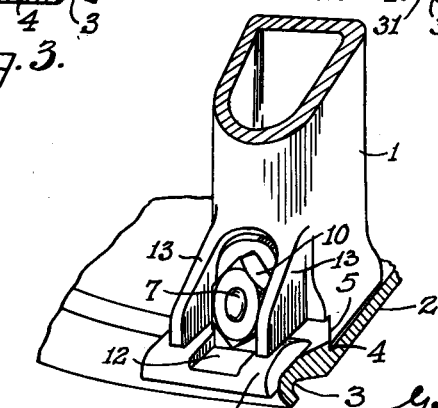
Figure 5:
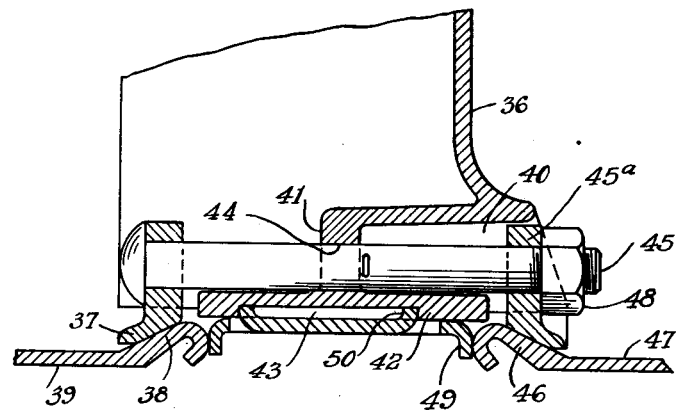

In the accompanying drawings illustrating the different forms of embodiment of my invention, Figure 1 is a radial sectional view taken through my improved positive dual rim mounting. Figure 2 is a radial, sectional view of the axially outer part of the same mounting. Figure 3 is a radial, sectional view taken through my new rim mounting adapted for a single wheel, showing how the rim is positively alined against a fixed stop on the spoke end, axially inward of an outboard clamp which engages the knuckle part of the rim gutter. Figure 4 is a perspective view of the same. Figure 5 is a radial, sectional view taken through a dual wheel employing my spacer band and aprons for engagement in the grooved spoke ends to achieve a positive alinement of the overhanging rims.

Figure 6:
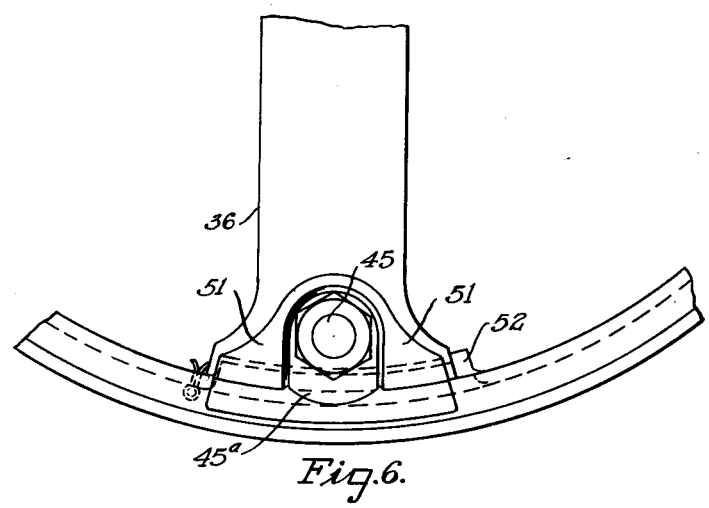
Figure 7:
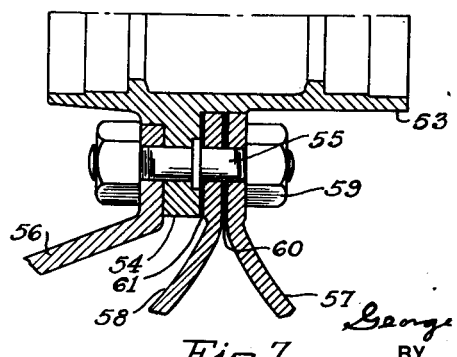

Figure 6 is a side view of one of said spoke ends, showing my spacer-apron means for positively alining the tire rims. And Figure 7 is a radial, sectional view taken through a wheel hub and dual discs secured thereto, showing the rubber gaskets placed between the discs and the hub to prevent the nuts on the securing bolts from loosening up in service.

Referring to the accompanying drawings for a detailed description of the various forms of embodiment of my invention illustrated therein, the numeral 1 in Figures 3 and 4 designates one of a plurality of spokes of a metal wheel body. Adapted to be mounted upon these spokes in a manner now to be described, is a tire rim 2 formed at its outer edge with a gutter 3. The radially inner surface of this gutter tapers axially inward to a shoulder 4 which is adapted to engage a shoulder 5 formed on the outboard face of the spoke end.

A wedge clamp 6 is carried by a bolt 7 which passes axially outward through a hole in each spoke end below an inboard axial boss 8 and an outboard axial boss 9 thereon. The head of each bolt is directly radially outward of the boss 8, while to the threaded end of the bolt a nut 10 is applied to draw the radially outer foot portion of the wedge clamp 6 against the knuckle part of the gutter 3 of the tire rim 2.

As shown in Figures 3 and 4 the wedge clamp 6 comprises an apron portion and an integral radial ear part 11 formed with a hole through which the bolt 7 projects. Formed in the apron portion of each wedge clamp is a rectangular hole 12 to permit a free turning movement of the nut 9. A pair of parallel guide wings 13, 13 project axially outwardly from the spoke end, as shown in Figure 4, to receive the ear portion 11 of the wedge clamp, and the nut applied to the bolt. The apron portion of the wedge clamp 6 is free to slide between the radially outer ends of the guide wings 13 and the gutter of the tire rim 2.

To apply the tire rim to the spoke ends, the wedge clamps 6 are removed, whereupon the rim may be mounted over the spoke ends from the outboard side of the wheel, with the shoulder 4 on the rim adjacent the shoulder 5 on each spoke. The wedge clamps 6 are then applied to the bolts 7, and the nuts 10 applied and tightened. The apron portions of the clamps will then engage the knuckle part of the gutter 3 of the rim axially outward of its tapered portion, to force its shoulder 4 tightly against the shoulder 5 on the spoke end to positively align the rim in a plane at right angles to the axis of the wheel. In this type of mounting the fulcrum of the rim is merged in the seat provided by the wedge clamp, which will be put under sufficient tension by the nut to afford a firm support for the rim. No separate alining ring is needed, thus making the mounting a simple, economical and efficient one.

In Figures 1 and 2, I have illustrated a substantially similar mounting for a dual wheel. In Figure 1 the numeral 14 designates one of a plurality of spokes of a wheel body (not shown). At its radially outer in-board end each spoke is formed with a tapered part 15 and a terminal, radial flange portion 16. The latter is adapted to be engaged by a shoulder 17 formed at the base of a tapered part 18 on the gutter 19 of an inboard tire rim 20. As shown in Figure 1 the knuckle portion of this gutter is engaged by the curved inboard side 21 of a spacer band 22 having a radially outward turned outboard side 23. The spacer band seats against the radially outer felloe portion of the spoke end. The shoulder 17 on the rim 20 is forced against the stop flange 16 on the spoke end, by the inboard side of the spacer band 22 to positively align the rim in a plane at right angles to the axis of the wheel. The curved inboard edge of this band acts like the apron portion of the wedge clamp 6 on the single wheel shown in Figures 3 and 4 in providing a firm seat for the inboard rim 20 without the necessity of using a separate alining ring.

Axially inward pressure is exerted against the spacer ring 22 by the following means. The outboard side of each spoke 14 flares axially outwardly toward its radial outer end to provide a lateral web 24. Projecting radially outwardly from this web is a flange 25 formed with a bolt hole below an inboard axial boss 26. A bolt 27 whose head is below this boss, projects axially outwardly through the hole in the flange to receive a wedge clamp 28. This clamp comprises a radial leg portion through a hole in which the bolt passes, and an inclined foot portion 29 which is adapted to engage the tapered part 30 of the gutter 31 of an outboard tire rim 32.

The inboard face of this gutter portion of the outboard tire rim is adapted to engage the radial side 23 of the spacer band 22, to force it inwardly when a nut 33 is applied to each bolt 27 and tightened. Guides 34, 34 similar to the guides 13, 13 in Figure 4, project outwardly from the spoke end to receive the wedge clamp and nut.

The spacer band 22, alined by its engagement with the felloe portion 35 of the spoke end, will positively align the outboard tire rim 32 when the nuts 33 are drawn tight, and will force the shoulder 17 on the inboard rim 20 against the fixed flange stop 16 on the spoke end to positively align it on the latter, the inboard curved part 21 of the spacer band being wedged between the felloe part of the spoke end and the knuckle portion of the gutter of the rim 20 to provide a firm support for it on the wheel.

In Figures 5 and 6, I have shown a dual metal wheel of the spoke type in which a band formed with aprons that fit in the grooved spoke ends, space and positively align the tire rims. In these figures the numeral 36 designates one of a plurality of spokes on a wheel body (not shown).

At the radially outer end of each spoke there is an outboard clamp 37 to support the inboard beveled gutter portion 38 of an inboard tire rim 39.

The outboard, radial outer portion of the spoke 36 is formed with a wedge-clamp receiving recess 40, which has a back radial wall 41 and a radially outer lateral felloe part 42 containing a groove 43 which is axially inward off center.

Passing axially outwardly through the clamp 37 and a hole 44 in the radial web 41 is a bolt 45 on the axially outer end of which an outboard wedge clamp 45ª is mounted. This clamp is tapered at its radially outer portion to engage the beveled portion of the gutter 46 of an outboard tire rim 47, when a nut 48 is tightened on the threaded end of the bolt. When the wedge clamps 37 and 45ª are moved toward each other by the nut, they will press the gutter ends of the inboard and outboard tire rims against the ends of a channel spacer band 49 from which alining aprons such as the apron 50, project radially inwardly, one apron for each spoke.

After the inboard tire rim 39 is mounted on the clamp 37, the spacer band 49 is brought to a position to cause the aprons 50 to enter the grooves 43 in the spoke ends when the band is turned circumferentially. The shoulders which the side walls of each groove 43 constitute, will hold the aprons 50 against lateral movement to make the spacer band, which engages the gutter portions of the rims 39 and 47, a means for positively alining them in planes at right angles to the axis of the wheel. As before stated, the outboard rim is forced against the spacer band by the wedge clamp 45ª, the latter being received by guides 51 on the spoke ends. A firm, positive mounting for the inboard and outboard tire rim results. A radial stop 52 is formed on each apron 50, as shown in Figure 6, to engage its respective spoke end after the apron is in place within the groove.

In Figure 7, I have shown a hub and demountable extended hub portion for a metal wheel, to prevent the nuts from loosening up in service. In this figure the numeral 53 designates a metal hub formed with a radial flange 54 provided with a hole to receive a bolt 55. Secured to the inboard side of the flange 54 by the bolt 55 is a brake drum 56. To the outer side of the flange 50 two wheel discs 57 and 58 in this instance, are secured by the bolts 55, and to the axially outer ends of these bolts nuts 59 are applied, one of which is shown in Figure 7.

Between the radially inner ends of the two discs 57 and 58, gaskets 60, which may be constructed of rubber, are inserted. Similar gaskets 61 are inserted between the radially inner end of the disc 58 and the radial flange 54. These gaskets have an action, tending to keep the nuts from loosening up in service.

Having described my invention, I claim:

1. A metal wheel including spokes, a fixed abutment on the radially outer end of each spoke, an edge-supported tire rim having a gutter portion at its outboard edge, a shoulder on the rim axially inward of its gutter portion for engagement with the fixed abutment on the spoke ends to positively align the rim, a wedge clamp secured to the outboard side of the spoke ends, and an apron portion on said clamp for engagement with the knuckle portion of the rim gutter to form a tensioned seat and fulcrum for the rim and to press the shoulder on the latter against the fixed abutment on the spoke ends.

2. A metal wheel including spokes, a fixed abutment on the radially outer end of each spoke, an edge-supported tire rim having a gutter portion at its outboard edge, a shoulder on the rim axially inward of its gutter portion for engagement with the fixed abutment on the spoke ends to positively align the rim, a pair of parallel guides projecting axially outward from each spoke end, a wedge clamp having a radial portion received by said guides, an apron portion on said wedge clamp radially outward of said guides, a bolt passing through the spoke end and the radial part of the wedge clamp, a nut applied to said bolt between the guides to engage the apron portion of the wedge clamp with the knuckle part of the rim gutter for the purpose specified.

GEORGE WALTHER.